(12) United States Patent
Gong (10) Patent No.: US 11,383,467 B2
(45) Date of Patent: Jul. 12, 2022

(54) APPARATUS AND METHOD FOR CONTINUOUSLY PRODUCING REINFORCED PLASTIC PIPE USING TRANSFER FILM

(71) Applicant: Suk Tae Gong, Anseong-si (KR)

(72) Inventor: Suk Tae Gong, Anseong-si (KR)

( * ) Notice: Subject to any disclaimer, the term of this patent is extended or adjusted under 35 U.S.C. 154(b) by 82 days.

(21) Appl. No.: 16/647,502

(22) PCT Filed: Sep. 14, 2018

(86) PCT No.: PCT/KR2018/010809
§ 371 (c)(1),
(2) Date: Mar. 14, 2020

(87) PCT Pub. No.: WO2019/054787
PCT Pub. Date: Mar. 21, 2019

(65) Prior Publication Data
US 2020/0215777 A1 Jul. 9, 2020

(30) Foreign Application Priority Data
Sep. 16, 2017 (KR) .......................... 10-2017-0119161

(51) Int. Cl.
*B29C 53/60* (2006.01)
*B29D 23/00* (2006.01)
(Continued)

(52) U.S. Cl.
CPC ............ *B29D 23/001* (2013.01); *B29C 53/60* (2013.01); *B29C 67/0014* (2013.01); *B29K 2105/06* (2013.01); *B29L 2023/22* (2013.01)

(58) Field of Classification Search
None
See application file for complete search history.

(56) References Cited

U.S. PATENT DOCUMENTS 3,155,559 A * 11/1964 Hall .................. B29C 53/74
156/195
3,271,064 A * 9/1966 Hall .................. B29C 53/74
264/508
(Continued)

FOREIGN PATENT DOCUMENTS

CN       2862618 Y    1/2007
CN      201409279 Y   2/2010
(Continued)

*Primary Examiner* — Jeffry H Aftergut
(74) *Attorney, Agent, or Firm* — Maschoff Brennan (57) ABSTRACT

An apparatus and a method enable continuous production of a reinforced plastic pipe using a transfer film. The transfer film moves at a predetermined speed in the longitudinal direction and is arranged to be in close contact with a circumferential surface of a base mold which winds glass fiber wound around the outer circumferential surface thereof using a filament winding method to mold a reinforced plastic pipe, such that the reinforced plastic pipe molded with the moving transfer film is moved forward, thereby being capable of continuously producing a reinforced plastic pipe with a desired length without breakage. The apparatus includes a rotary axial pipe; a base mold; a transfer film feeding part; and a transfer film withdrawing part. The method for continuously producing a reinforced plastic pipe includes a transfer film adhering step; a transfer film forced moving step; and a pipe cutting and separating step.

32 Claims, 5 Drawing Sheets (51) Int. Cl.
 *B29C 67/00* (2017.01)
 *B29K 105/06* (2006.01)
 *B29L 23/00* (2006.01)

(56) References Cited

U.S. PATENT DOCUMENTS

| | | | | |
|---|---|---|---|---|
| 3,464,879 | A * | 9/1969 | Ulrik | B29C 53/74 156/425 |
| 3,548,724 | A * | 12/1970 | Hall | B29C 53/74 493/292 |
| 3,655,489 | A * | 4/1972 | Poulsen | B29C 53/74 156/429 |
| 3,679,521 | A * | 7/1972 | Poulsen | B29C 53/74 156/429 |
| 3,865,526 | A * | 2/1975 | Drostholm | B29C 53/74 425/140 |
| 3,874,970 | A * | 4/1975 | Dunn | B65H 81/00 156/169 |
| 3,943,224 | A * | 3/1976 | Drostholm | B29C 53/74 264/209.2 |
| 3,979,250 | A * | 9/1976 | Drostholm | B29C 48/08 156/425 |
| 4,011,354 | A * | 3/1977 | Drostholm | B29C 53/74 427/195 |
| 4,081,302 | A * | 3/1978 | Drostholm | B29C 53/74 138/129 |
| 4,082,597 | A * | 4/1978 | Drostholm | B29C 53/74 156/429 |
| 4,097,568 | A * | 6/1978 | Foley | B29D 22/003 138/175 |
| 4,110,149 | A * | 8/1978 | Poulsen | B29C 53/74 156/429 |
| 4,213,811 | A * | 7/1980 | Hall | F16L 11/1185 156/195 |
| 4,689,003 | A * | 8/1987 | Schreiner | B29C 41/26 425/224 |

FOREIGN PATENT DOCUMENTS

| | | |
|---|---|---|
| EP | 2730154 A1 | 5/2014 |
| JP | S52135371 A | 11/1977 |
| KR | 10-2006-0018803 A | 2/2006 |
| KR | 20060018803 A | 3/2006 |
| KR | 10-0629959 B1 | 9/2006 |
| KR | 100629959 B1 | 9/2006 |
| KR | 10-0728177 B1 | 6/2007 |
| KR | 100728177 B1 | 6/2007 |
| KR | 10-0937892 B1 | 2/2010 |
| KR | 100937892 B1 | 2/2010 |
| KR | 10-1448259 B1 | 10/2014 |

* cited by examiner

APPARATUS AND METHOD FOR CONTINUOUSLY PRODUCING REINFORCED PLASTIC PIPE USING TRANSFER FILM

TECHNICAL FIELD

The present invention relates to an apparatus for continuously manufacturing a reinforced plastic pipe using a transfer film and a method thereof, and more particularly to an apparatus for continuously manufacturing a reinforced plastic pipe using a transfer film, the apparatus being characterized in that a transfer film, which moves at a set speed, is placed in a longitudinal direction of a base mold on an outer circumferential surface of the base mold to be in close contact with the outer circumferential surface, and glass fiber is wound around the outer circumferential surface according to a filament winding method, and thus, a reinforced plastic pipe to be molded moves forward along with a moving transfer film, so that the reinforced plastic pipe can be continuously manufactured to a desired length, and a method of continuously manufacturing a reinforced plastic pipe using a transfer film.

BACKGROUND ART

Fiber reinforced plastics (FRP), which are plastics reinforced with continuous fibers or chopped fibers, have high resistance to corrosion, high strength per unit weight compared to existing construction materials such as steel, and low weight, and thus, can be easily installed. In addition, maintenance costs of FRP are low, thus being semi-permanent.

Accordingly, reinforced plastics have recently been used as a structural material for various purposes in the construction field. Pipes made of reinforced plastics have excellent corrosion resistance, thus being widely used as ducts for air conditioning facilities in semiconductor factories. In addition, pipes made of FRP are used for pillars of buildings, underwater piers and general piers, offshore structures, ground reinforcement piles, water pipes, and the like.

With regard to reinforced plastic pipe production, there are two methods: first, a filament winding method and second, a manufacturing method using centrifugal force.

A filament winding method refers to a method of impregnating a continuous glass fiber in a resin and spirally winding the same round a cylindrical frame. A manufacturing method using centrifugal force is characterized by molding a resin and chopped fiber by centrifugal force in a cylinder such as a concrete fume pipe.

An FRP material is an anisotropic material with different strength characteristics according to the orientation direction and amount of glass fiber. The continuity of glass fiber is also a major factor affecting strength characteristics.

Meanwhile, a glass-fiber reinforced plastic pipe (GRP pipe, hereinafter referred to as "reinforced plastic pipe"), as one type of pipes made of such FRP is manufactured using a filament winding method.

An apparatus for manufacturing a reinforced plastic pipe according to a general filament winding method is described below with reference to FIG. 1.

Figure 1:
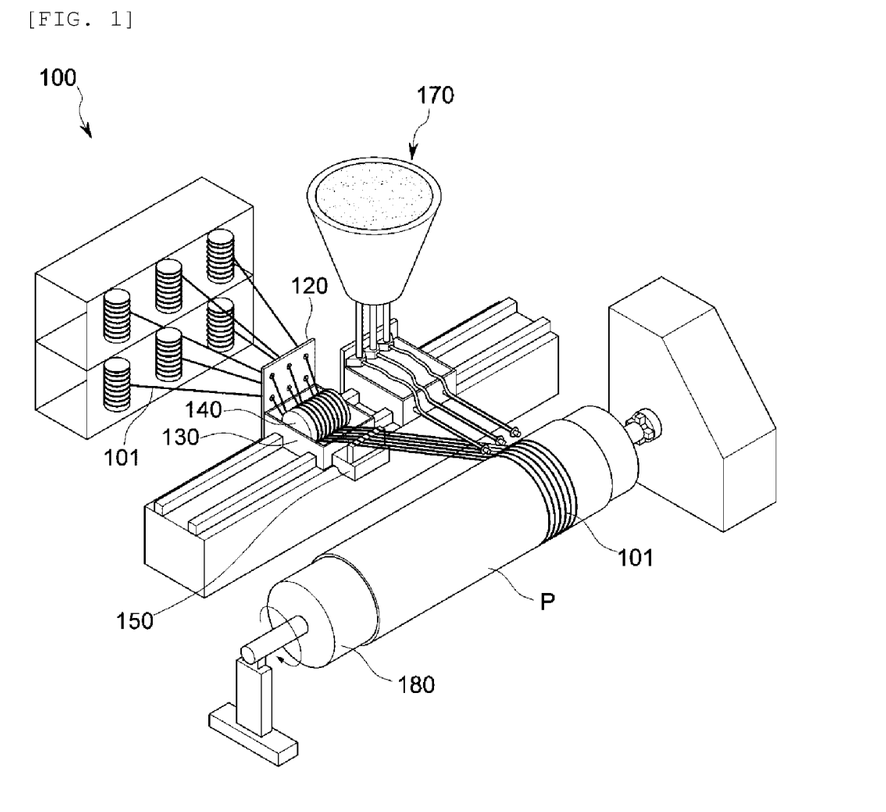
FIGS. 1 and 2 illustrate schematic views of apparatuses for manufacturing a reinforced plastic pipe according to a conventional technology.

As shown in FIG. 1, the conventional apparatus includes a plurality of supply reels 110, an alignment part 120, a resin supply tank 130, an impregnation roller 140, a thread spacing controller 150, a guide rod 160, a wear-resistant material supply device 170, and a mandrel 180.

The glass fiber material 101 in the form of several strands or cloth is transferred into the resin supply tank 130 such that the glass fiber material 101 is impregnated in a resin contained in the resin supply tank 130. The multiple strands of glass fiber material 101 impregnated with the resin are wound around the rotating mandrel 180 to form a pipe shape.

In addition, the reinforced plastic pipe (P) having a circular pipe shape according to the shape of the mandrel 180 is hardened by a hardening means such as a heater, thereby being produced into a complete reinforced plastic pipe (P).

However, in the case of such a manner, pipes can be produced by a preset mandrel length, which causes a limitation in length.

Accordingly, to manufacture a reinforced plastic pipe (P) having a required length, two or more pipes should be connected or a mandrel having a desired length should be separately manufactured. Thereby, connected pipes are easily cracked or broken due to impact or bending, and additional costs are required to connect pipe ends to each other.

To compensate for this, apparatuses capable of continuously producing a reinforced plastic pipe (P) have been suggested.

Particularly, glass fiber and a synthetic resin are previously impregnated in a mold that continuously rotates forward, and are hardened at room temperature or high temperature.

A continuous filament winding method is mainly used to produce industrial irrigation ditch pipes, power plant cooling pipes, water and sewage pipes, etc.

Figure 2:
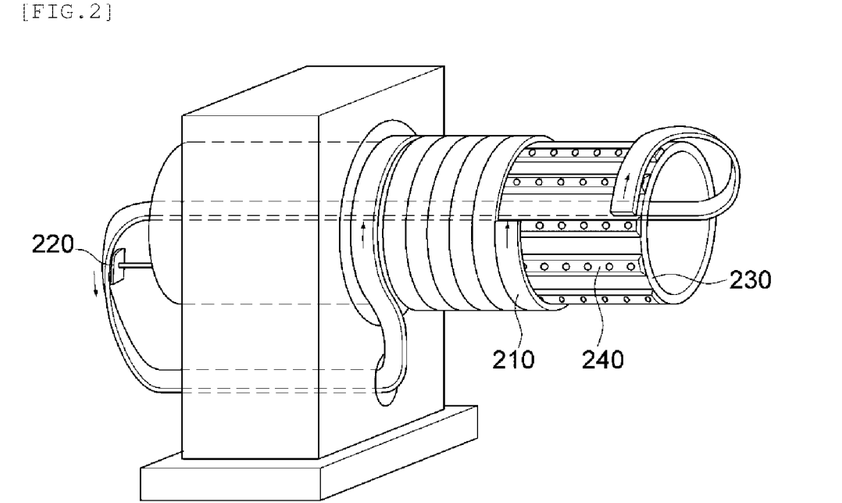

FIG. 2 illustrates an example of an apparatus using a continuous filament winding method. This apparatus uses a steel band 210.

The steel band 210 is wound around a drive shaft 230 driven by a motor 220, and covered with a film (not shown) to be released from a pipe formed on the steel band 210, followed by hardening glass fiber, a synthetic resin, a filler, a fiber reinforcement, etc.

After the hardening, the steel band 210 is separated to complete a pipe.

The steel band 210 may continuously produce a reinforced plastic pipe in a manner of returning along a hollow interior of the drive shaft 230.

However, such a conventional apparatus using the steel band 210 is complicated. In addition, the steel band 210 may be overlapped when sufficient tension is not applied to the steel band 210, which may cause an operation to stop.

In addition, the conventional apparatus using the steel band 210 can only produce a circular pipe for smooth movement of a steel band.

Further, displacement due to friction between the steel band 210 and a film increases with increasing length, so that the thickness of a molded reinforced plastic pipe (P) becomes nonuniform.

Therefore, there is a need for an apparatus having a simple structure and being capable of stably, continuously producing a reinforced plastic pipe having a constant thickness and strength, and a method thereof.

DISCLOSURE

Technical Problem

Therefore, the present invention has been made in view of the above problems, and it is one object of the present invention to provide an apparatus for continuously manufacturing a reinforced plastic pipe using a transfer film and a method thereof. Particularly, the apparatus is characterized in that a transfer film, which moves at a set speed, is placed in a longitudinal direction of a base mold on an outer circumferential surface of the base mold to be in close contact with the outer circumferential surface, and thus, a reinforced plastic pipe to be molded moves forward along with a moving transfer film, so that the reinforced plastic pipe can be continuously manufactured to a desired length.

Technical Solution

In accordance with an aspect of the present invention, the above and other objects can be accomplished by the provision of an apparatus for continuously manufacturing a reinforced plastic pipe using a transfer film, the apparatus being characterized by winding an outer circumferential surface of a rotating base mold with a resin-impregnated glass fiber according to a filament winding method and hardening the same to continuously manufacture a reinforced plastic pipe to a predetermined length according to setting.

For this, the apparatus for continuously manufacturing a reinforced plastic pipe using a transfer film includes a shaft tube configured to have a certain length and a hollow tubular shape, front and rear ends of which are opened, supported by a frame part, and configured to rotate at a rotational speed according to setting by a driving part; a base mold configured to have a tubular shape having an outer circumferential surface of any one of a variety of cross-sectional shapes including a circle, a polygon and an oval and to rotate integrally with the shaft tube with respect to the shaft tube as a central axis; a transfer film supply part configured to rotate in the same manner as the shaft tube while supplying a transfer film that covers a longitudinal outer circumferential surface of the base mold and winds the longitudinal outer circumferential surface in close contact therewith from the rear to the front, wherein an end of the transfer film in close contact in the front is introduced into an opened hollow on a front end side of the shaft tube from a front edge of the base mold and passes through a rear end of the shaft tube; and a transfer film draw-out part disposed in the rear of the shaft tube and configured to grasp an end of the transfer film, which has passed through the hollow, and to forcibly withdraw the same backward at a speed according to setting so as to move the transfer film in close contact with the outer circumferential surface of the base mold forward at a speed according to setting.

Accordingly, the reinforced plastic pipe is continuously manufactured while moving the reinforced plastic pipe, which is wound and molded on a film, forward according to forward movement of the transfer film in close contact with the outer circumferential surface of the base mold.

Meanwhile, as needed, the apparatus may further include a base film supply part for supplying a base film that spirally covers and winds an outer circumferential surface of the base mold including the transfer film, from one side.

In addition, as needed, the base mold may include a plurality of perforations into which air or a lubricant for reducing friction between the outer circumferential surface of the base mold and a film are introduced.

In addition, as needed, at least a front part of the base mold may be tapered in a longitudinal direction to have an angle according to setting.

Meanwhile, a tip edge of each of the base mold and the shaft tube, which are in contact with the transfer film, preferably has a round surface for slip of the transfer film.

In addition, as needed, the base mold may further include a plurality of tapered members extending in a longitudinal direction from a tip to have an inclined angle tapered in a central axis direction; and a plurality of the guide pulleys disposed at upper parts of the tapered members and configured to support the transfer film and guide the transfer film into a hollow of the shaft tube.

In addition, the film guide member may further include a circular support plate for connecting and supporting a plurality of tapered members; and a guide ring for pressing the transfer film to prevent separation thereof.

Meanwhile, as needed, a base support part for supporting the rotating base mold may be further provided at a lower part of the front of the base mold.

In addition, the transfer film draw-out part may include a pair of transfer gears configured to bite and pull the transfer film using engaged gear cogs; or a winding rod for winding and pulling the transfer film.

Meanwhile, a glass fiber mat supply part for supplying the glass fiber mat for covering a longitudinal outer circumferential surface of the base mold to an upper part of a film while rotating at the same speed as the base mold may be further provided on one side of the base mold.

In an embodiment, the glass fiber mat supply part may include supports configured to rotate at the same speed in synchronization with the base mold by power from a supply part that is on one side of the rear of the base mold; and a plurality of the winding rolls which are supported by the supports and around which the glass fiber mat is wound.

Meanwhile, a method of continuously manufacturing a reinforced plastic pipe using the apparatus for continuously manufacturing a reinforced plastic pipe using a transfer film is as follows.

The method includes a horizontal transfer film adhesion step of winding a longitudinal outer circumferential surface of a base mold with a transfer film in close contact therewith from the rear to the front, introducing a front end of the transfer film into an opened hollow at a front end of a shaft tube from a front edge of the base mold, and placing to pass the front end through a rear end of the shaft tube; a forced transfer film movement step of grasping the end of the transfer film, which has passed through the hollow of the shaft tube, while rotating the shaft tube and the base mold at a speed according to setting, and forcibly withdrawing the end backward at a speed according to setting to move the transfer film in close contact with the outer circumferential surface of the base mold forward; a glass fiber winding-molding step of winding the outer circumferential surface of the base mold, to which the transfer film has been closely attached, with a resin-impregnated glass fiber from one side of the outer circumferential surface of the base mold to laminate and mold the reinforced plastic pipe and continuously moving forward the molded reinforced plastic pipe by the transfer film; a hardening step of hardening the moved reinforced plastic pipe, which has been subjected to the glass fiber winding-molding step, using a hardening means; and a pipe cutting and separation step of cutting and separating the reinforced plastic pipe, which has been subjected to the hardening step, to a predetermined length using a cutting means.

Meanwhile, as needed, the method may further include a longitudinal base film adhesion step of spirally covering and winding an outer circumferential surface of the base mold, which has been subjected to the horizontal transfer film adhesion step, from a side with a base film.

In addition, as needed, the glass fiber winding-molding step may include a process of covering the film on a longitudinal outer circumferential surface of the base mold with a glass fiber mat in the same manner as the transfer film so as to increase the longitudinal tensile strength of a reinforced plastic pipe to be molded.

Advantageous Effects

As apparent from the above description, by an apparatus for continuously manufacturing a reinforced plastic pipe using a transfer film according to the present invention and a method thereof, a transfer film moving at a set speed is placed in close contact with an outer circumferential surface of a base mold in a longitudinal direction of the base mold, and thus, a reinforced plastic pipe to be molded is moved forward along with the transfer film, so that the reinforced plastic pipe can be continuously manufactured to a desired length.

In addition, the base mold rotating with respect to a shaft tube as a central axis can have a variety of cross-sectional shapes, such as a circle, a polygon, and an oval, as needed, so that reinforced plastic pipes of various sizes and shapes can be produced.

Further, depending upon the size of the base mold coupled to the shaft tube, reinforced plastic pipes of various diameters desired by a producer can be produced.

In addition, since the structure of the apparatus is simple, it is easy to assemble and produce the same, and product competitiveness can be increased due to low production costs.

BEST MODE FOR CARRYING OUT THE INVENTION

As a best mode of the present invention, provided is an apparatus for continuously manufacturing a reinforced plastic pipe using a transfer film, the apparatus being characterized by winding an outer circumferential surface of a rotating base mold 40 with a resin-impregnated glass fiber 3 according to a filament winding method and hardening the same to continuously manufacture a reinforced plastic pipe (P) to a predetermined length according to setting.

The apparatus includes a shaft tube 30 configured to have a certain length and a hollow tubular shape, front and rear ends of which are opened, supported by a frame part 10, and configured to rotate at a rotational speed according to setting by a driving part 20;

a base mold 40 configured to have a tubular shape having an outer circumferential surface of any one of a variety of cross-sectional shapes including a circle, a polygon and an oval and to rotate integrally with the shaft tube 30 with respect to the shaft tube 30 as a central axis;

a transfer film supply part 50 configured to rotate in the same manner as the shaft tube 30 while supplying a transfer film 51 that covers a longitudinal outer circumferential surface of the base mold 40 and winds the longitudinal outer circumferential surface in close contact therewith from the rear to the front, wherein an end of the transfer film 51 in close contact in the front is introduced into an opened hollow on a front end side of the shaft tube 30 from a front edge of the base mold 40 and passes through a rear end of the shaft tube 30; and a transfer film draw-out part 60 disposed in the rear of the shaft tube 30 and configured to grasp an end of the transfer film 51, which has passed through the hollow, and to forcibly withdraw the same backward at a speed according to setting so as to move the transfer film 51 in close contact with the outer circumferential surface of the base mold 40 forward at a speed according to setting, wherein the reinforced plastic pipe (P) is continuously manufactured while moving the reinforced plastic pipe (P), which is wound and molded on a film, forward according to forward movement of the transfer film 51 in close contact with the outer circumferential surface of the base mold 40.

In addition, as a best mode of the present invention, provided is a method of continuously manufacturing a reinforced plastic pipe using the apparatus for continuously manufacturing a reinforced plastic pipe using a transfer film.

The method includes a horizontal transfer film adhesion step (S1) of winding a longitudinal outer circumferential surface of a base mold 40 with a transfer film 51 in close contact therewith from the rear to the front, introducing a front end of the transfer film 51 into an opened hollow at a front end of a shaft tube 30 from a front edge of the base mold 40, and placing to pass the front end through a rear end of the shaft tube 30;

a forced transfer film movement step (S2) of grasping the end of the transfer film 51, which has passed through the hollow of the shaft tube 30, while rotating the shaft tube 30 and the base mold 40 at a speed according to setting, and forcibly withdrawing the end backward at a speed according to setting to move the transfer film 51 in close contact with the outer circumferential surface of the base mold 40 forward;

a glass fiber winding-molding step (S3) of winding the outer circumferential surface of the base mold 40, to which the transfer film 51 has been closely attached, with a resin-impregnated glass fiber 3 from one side of the outer circumferential surface of the base mold 40 to laminate and mold the reinforced plastic pipe (P) and continuously moving the molded reinforced plastic pipe (P) forward by the transfer film 51;

a hardening step (S4) of hardening the moved reinforced plastic pipe (P), which has been subjected to the glass fiber winding-molding step (S3), using a hardening means 4; and a pipe cutting and separation step (S5) of cutting and separating the reinforced plastic pipe (P), which has been subjected to the hardening step (S4), to a predetermined length using a cutting means 5.

MODE FOR CARRYING OUT THE INVENTION

Hereinafter, preferred embodiments of an apparatus for continuously manufacturing a reinforced plastic pipe using a transfer film according to the present invention and a method thereof are described in detail.

In addition, in describing the present invention, an upper part or an upper direction refers to a part or direction having a height from a surface of a bottom on which a manufacturing apparatus is installed, and a lower part or a lower direction refers to a part or direction opposite thereto.

In addition, a front part or a front direction refers to a part or direction where a reinforced plastic pipe molded by a manufacturing apparatus moves, and a rear part or a rear direction refers to a part or direction opposite thereto.

Further, a longitudinal direction is another expression referring to a direction in which a molded reinforced plastic pipe moves.

In addition, in describing the present invention, detailed descriptions of related known functions or configurations will be omitted so as not to obscure the subject matter of the present invention.

As shown in the drawings, an apparatus 1 for continuously manufacturing a reinforced plastic pipe using a transfer film according to the present invention is characterized by winding a resin-impregnated glass fiber material 3 around an outer circumferential surface of a rotating base mold 40 according to a filament winding method and hardening the resin-impregnated glass fiber material 3 to continuously manufacture a reinforced plastic pipe (P) having a predetermined length.

In addition, the reinforced plastic pipe (P) may be continuously manufactured to have a variety of cross-sectional shapes, such as a circle, a polygon, and an oval, without specific limitation.

For this, a transfer film 51, which moves at a set speed in a longitudinal direction, is placed in close contact with an outer circumferential surface of the base mold 40, so that the reinforced plastic pipe (P) may move forward in the same way as the transfer film 51 is moved.

In particular, the apparatus 1 for continuously manufacturing a reinforced plastic pipe using a transfer film according to the present invention broadly includes a shaft tube 30 configured to rotate at a rotational speed according to setting; a base mold 40 configured to rotate integrally with the shaft tube 30 and determine the shape of a reinforced plastic pipe (P); a transfer film supply part 50 configured to supply the transfer film 51 while rotating in the same way as the shaft tube 30; and a transfer film draw-out part 60 configured to forcibly withdraw the transfer film 51 to the rear.

Here, the aforementioned components are supported by a frame part 10 including various frames at positions as necessary, and a driving part 20 configured to supply power to operate the shaft tube 30, the transfer film supply part 50, the transfer film draw-out part 60, etc. is provided on one side of the manufacturing apparatus 1.

Although not shown in the drawings, an electrically connected control panel (not shown) for integrated control of the operation of each component is included.

First, the apparatus 1 for continuously manufacturing a reinforced plastic pipe using a transfer film according to the present invention will be described in more detail with reference to FIGS. 3, 4(a) and 4(b).

First, the shaft tube 30 has a predetermined length and a hollow tube shape, inlets of front and rear ends of which are opened.

Here, the shaft tube 30 is supported by the frame part 10, and more particularly is supported by a main frame 11 and a shaft tube support frame 12 to be positioned at a certain height from the bottom. In addition, the shaft tube 30 rotates at a rotational speed according to setting by the driving part 20 according to control.

In an embodiment, the driving part 20 includes a motor 21 and a decelerator 22.

In addition, a chain 24 is connected to a driving sprocket 23 rotated by the motor 21. The chain 24 is connected to a driven sprocket 31 formed at a rear end of the shaft tube 30 to rotate the shaft tube 30 according to a rotational speed of the motor 21 of the driving part 20.

Here, the support frame 12 supporting the shaft tube 30 includes a bearing for supporting rotation of the shaft tube 30.

Meanwhile, the shape of the reinforced plastic pipe (P) is determined according to an outer circumferential surface of the base mold 40, and thus, the base mold 40 is configured to rotate integrally with the shaft tube 30 based on a central axis of the shaft tube 30.

Here, the base mold 40 is a tubular type having a circular section shape or, as needed, any one of various cross-sectional shapes including a polygon and an oval.

Figure 7:
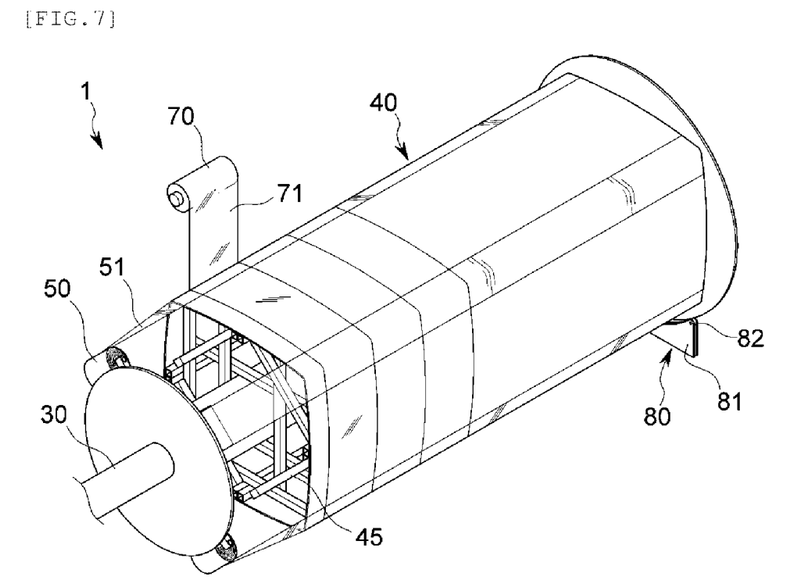
FIG. 7 is a schematic view illustrating another embodiment of a base mold applied to an apparatus for continuously manufacturing a reinforced plastic pipe using a transfer film according to the present invention.

In addition, referring to FIG. 7, a width between the base mold 40 and the shaft tube 30 may be determined by a mold support holder 45 constituted of a plurality of supports as needed, which indicates that the reinforced plastic pipe (P) may be manufactured to have various diameters and sizes according to a producer's choice.

Figure 3:
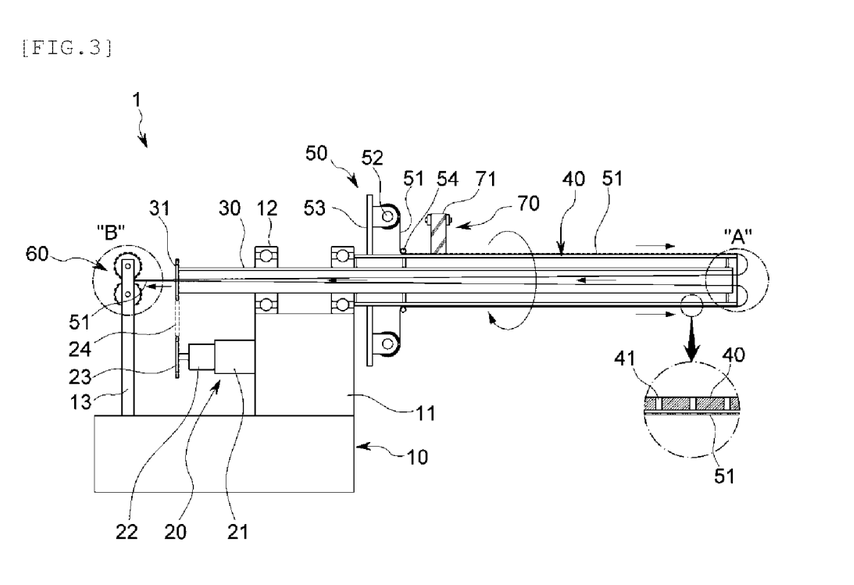
FIG. 3 illustrates a schematic view of an apparatus for continuously manufacturing a reinforced plastic pipe using a transfer film according to an embodiment of the present invention.
Figure 4A:
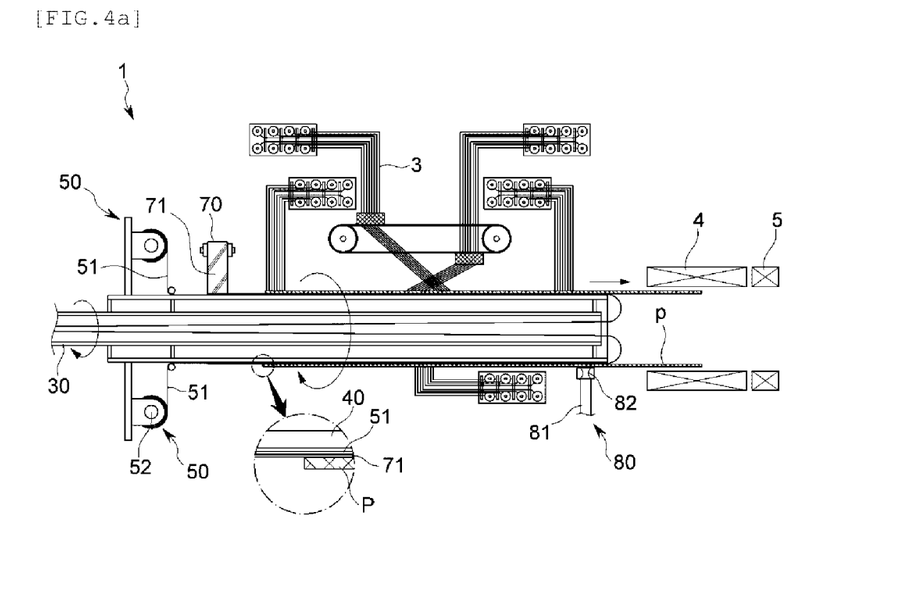
FIG. 4(a) is a schematic view illustrating a process of manufacturing a reinforced plastic pipe using the apparatus for continuously manufacturing a reinforced plastic pipe using a transfer film of FIG. 3.
Figure 4B:
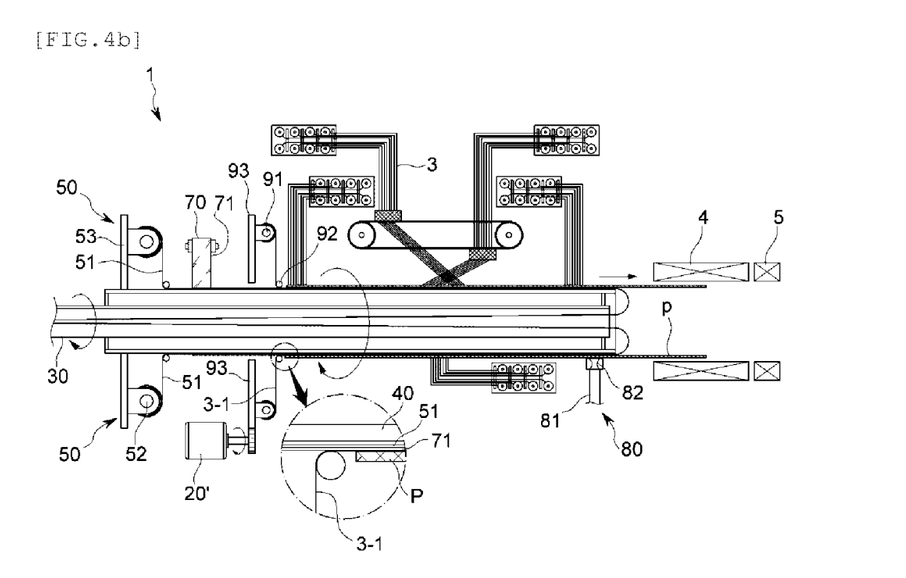
FIG. 4(b) is a schematic view illustrating a process of manufacturing a reinforced plastic pipe including a longitudinal glass fiber mat using the apparatus of FIG. 4(a).

Meanwhile, referring to FIGS. 3, 4(a) and 4(b) again, the transfer film supply part 50 supplies the transfer film 51 that covers a longitudinal outer circumferential surface of the base mold 40 and is placed in close contact with the longitudinal outer circumferential surface from the rear to the front.

Preferably, the transfer film supply part 50 includes a support 53 that is located on a rear side of the base mold 40 or integrated with the shaft tube 30; and a plurality of winding rolls 52 which are disposed at a certain interval on the support 53 and around which the transfer film 51 is wound.

Accordingly, the transfer film supply part 50 rotates at the same speed as the shaft tube 30 and the base mold 40, and the transfer film 51 unwound from the winding rolls 52 is pressed by film guides 54, thus being in close contact with and covering an outer circumferential surface of the base mold 40 in a longitudinal direction thereof.

Meanwhile, one end of the transfer film 51 in close contact with the front of the base mold 40 is introduced into an opened hollow on a front side of the shaft tube 30 from a front edge of the base mold 40 and passes through a rear end.

The passed transfer film 51 is forcibly drawn out rearward by the aforementioned transfer film draw-out part 60.

Meanwhile, a plurality of transfer films 51 are continuously disposed. Preferably, the transfer films 51 are disposed to cover an entirety of an outer circumferential surface of the base mold 40.

If the reinforced plastic pipe (P) molded according to a filament winding method described below may be moved forward, the transfer film 51 may be naturally disposed at a certain distance from the transfer film 51 adjacent to an outer circumferential surface of the base mold 40.

Figure 5:
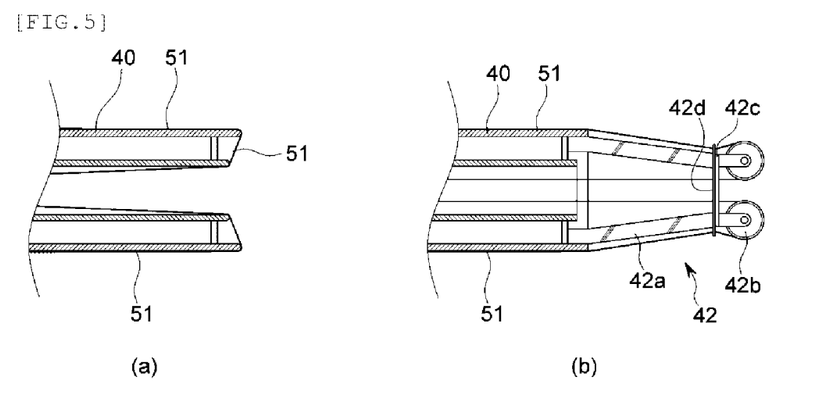
FIG. 5 is a schematic view illustrating an embodiment of a base mold applied to an apparatus for continuously manufacturing a reinforced plastic pipe using a transfer film according to the present invention.

Meanwhile, referring to FIG. 5(*a*), a tip edge of the base mold 40 and a tip edge of the shaft tube 30 which are in contact with the transfer film 51 is formed in a rounded surface shape to facilitate sliding of a film.

In addition, referring to FIG. 5(*b*), a film guide member 42 may be further included on a front end side of the base mold 40 to facilitate movement of the transfer film 51 and reduce frictional force.

The film guide member 42 is configured so as not to interfere with the reinforced plastic pipe (P) moving forward along an outer circumferential surface of the base mold 40.

In an embodiment, the film guide member 42 includes a plurality of tapered members 42*a* configured to extend in a longitudinal direction to have an inclined angle tapered in a central axis direction of the base mold 40 and spaced from each other at a tip; and a plurality of guide pulleys 42*b* respectively disposed at upper parts of the tapered members 42*a* to support the transfer film 51 and guide the transfer film 51 into a hollow of the shaft tube 30.

Meanwhile, as needed, the film guide member 42 includes a circular support plate 42*c* configured to connect and support the plurality of tapered members 42*a*; and a guide ring 42*d* configured to press the transfer film 51 to prevent separation of the transfer film 51.

The guide ring 42*d* may be made of a metal material or a rope.

Meanwhile, referring to FIGS. 3, 4(*a*) and 4(*b*), the transfer film draw-out part 60 is located at the rear of the shaft tube 30, and grasps an end of the transfer film 51, which has passed through a hollow of the shaft tube 30, and forcibly draws out the same rearward at a speed according to setting by control.

Accordingly, the transfer film 51 in close contact with an outer circumferential surface of the base mold 40 moves from the rear to the front at a speed according to setting.

The transfer film draw-out part 60 may have various structures and configurations so long as it can pull an end of the transfer film 51.

Figure 6:
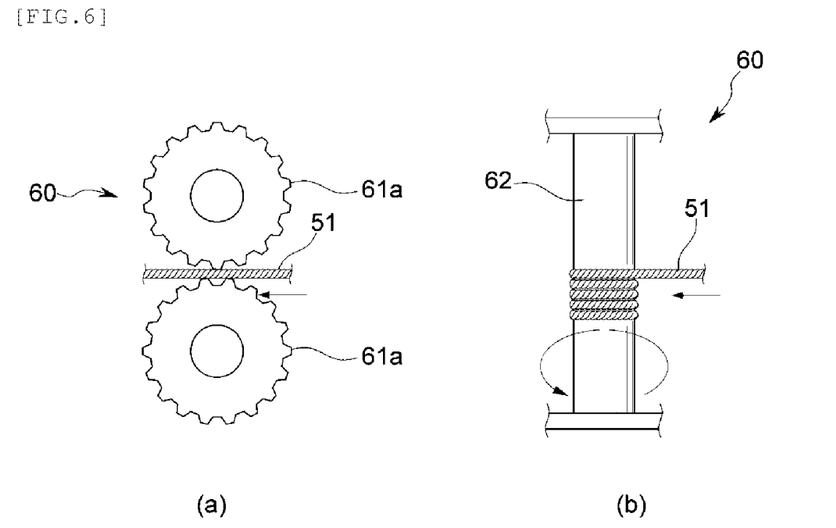
FIG. 6 is a schematic view illustrating a transfer film draw-out part applied to an apparatus for continuously manufacturing a reinforced plastic pipe using a transfer film according to the present invention.

In an embodiment, referring to FIG. 6(*a*), the transfer film draw-out part 60 includes a pair of transfer gears 61 configured to bite and pull the transfer film 51 using engaged gear cogs 61*a*.

The pair of transfer gears 61 are supported by the draw-out part support frame 13 of the frame part 10, and are coupled with a rotating shaft, which rotates at a set speed by a driving motor, to pull reward the transfer film 51 collected while being rotated at a speed according to setting.

Meanwhile, since an end of the transfer film 51 withdrawn and collected in a state in which an end of the transfer film 51 is bitten by the transfer film draw-out part 60 is fixed to the transfer film draw-out part 60, the transfer film 51 is collected in the transfer film draw-out part 60 according to rotation of the shaft tube 30 and the base mold 40. Accordingly, a twist starts from the fixed end, thereby forming a single rope.

A puled rope-type transfer film 51 is collected and separately processed.

Meanwhile, in another embodiment, the transfer film draw-out part 60 may include a winding rod 62 for winding and pulling a rope-type transfer film 51 with reference to FIG. 6(*b*).

Here, the winding rod 62 is supported by the draw-out part support frame 13 of the frame part 10 and winds the transfer film 51 while pulling the transfer film 51 backward while being rotated at a set speed by the driving motor.

By the apparatus 1 for continuously manufacturing a reinforced plastic pipe using a transfer film according to the present invention manufactured as described above, glass fiber 3 on the transfer film 51 moves forward a reinforced plastic pipe (P) wound and molded according to a filament winding method as the transfer film 51 wound around and closely attached to an outer circumferential surface of the base mold 40 in a longitudinal direction from the rear to the front is moved forward, thereby continuously manufacturing a pipe.

Meanwhile, referring to FIGS. 3 and 4 again, the apparatus 1 for continuously manufacturing a reinforced plastic pipe using a transfer film according to the present invention may further include a base film supply part 70 for supplying a base film 71 that spirally covers and winds around an outer circumferential surface of the base mold 40, which includes the transfer film 51, from a side. Particularly, the base film supply part 70 is provided on one side of the front of the transfer film supply part 50.

As described above, the transfer film 51 is unwound by the winding rolls 52 of the transfer film supply part 50 spaced at a plurality of intervals and winds an outer circumferential surface of the base mold 40 in close contact in a longitudinal direction from the rear to the front.

Here, an outer circumferential surface of the base mold 40 may be covered with only the transfer film 51. However, to facilitate more stable separation and movement of the base mold 40 and the reinforced plastic pipe (P), the base film 71 is wound around an outer circumferential surface of the base mold 40 in the axial direction.

The base film supply part 70 has the same structure as the transfer film supply part 50 and is disposed to be fixed at a position determined by the frame part 10, on a side of the base mold 40.

Hereinafter, a method of using the base film 71 is described.

First, an end of the base film 71 is fixed to one side of the transfer film 51 moving forward, using a tape or the like.

In addition, the transfer film 51 is forcibly withdrawn backward by the transfer film draw-out part 60 while the shaft tube 30 and the base mold 40 rotate, and the transfer film 51 in close contact with an outer circumferential surface of the base mold 40 moves forward while rotating in accordance with rotation of the shaft tube 30 and the base mold 40.

Here, the base film 71, an end of which is fixed to one side of the transfer film 51, also winds an outer circumferential surface of the base mold 40 in the axial direction while being unwound in the base film supply part 70.

Here, by the moving transfer film 51, the outer circumferential surface of the base mold 40 is spirally covered and entirely surrounded with the base film 71.

Accordingly, the outer circumferential surface of the base mold 40 is separated from the reinforced plastic pipe (P), wound and molded by the glass fiber 3, by the base film 71 and the transfer film 51.

Meanwhile, referring to FIG. 3 again, the base mold 40 has a structure to reduce outer circumferential surface friction with the transfer film 51 or the base film 71.

As needed, a lubricant may be applied to the outer circumferential surface such that a film is easily slid and moved.

In an embodiment, as needed, a plurality of perforations 41 may be formed at a certain interval at an outer circumferential surface of the base mold 40.

Due to the perforations 41, air or a lubricant is introduced between a film and an outer circumferential surface of a mold, thereby reducing frictional force.

In another embodiment, the base mold 40 may have a tubular shape, at least a front portion of which is tapered to have a set angle in a longitudinal direction from the rear to the front, so as to facilitate movement of the transfer film 51.

Such a set angle is preferably 0° or more and 1° or less.

When the set angle is greater than 1°, the transfer film 51 moves along an excessively tapered outer circumferential surface, so that an inner diameter of a reinforced plastic pipe to be molded may be changed.

Meanwhile, referring to FIGS. 3, 4 and 9 again, a base support part 80 for supporting the rotating base mold 40 is further provided at a lower part of the front of the base mold 40.

Here, the base support part 80 includes a support roller 82 and frame support 81 for supporting a lower part of the base mold 40.

In addition, as needed, a structure movable in a longitudinal direction of the base mold 40 is naturally allowed.

Meanwhile, referring to FIGS. 4(a) and 4(b) again, a hardening means 4 for hardening the molded reinforced plastic pipe (P); and a cutting means 5 for cutting the hardened reinforced plastic pipe (P) to a predetermined length may be further included in front of the base mold 40 of the apparatus 1 for continuously manufacturing a reinforced plastic pipe according to the present invention.

As described above, by the apparatus 1 for continuously manufacturing a reinforced plastic pipe using a transfer film according to the present invention, the glass fiber 3 is laminated on the transfer film 51, covered and wound in a longitudinal direction of the base mold 40, and the base film 71, spirally wound from a side, to continuously manufacture the reinforced plastic pipe (P).

Meanwhile, referring to FIG. 4(b) again, a glass fiber mat 3-1 is further included to further increase the longitudinal tensile strength of the manufactured reinforced plastic pipe (P) and thus to prevent breakage and bending of the pipe (P) when used in the field.

For this, a glass fiber mat supply part 90 for supplying the glass fiber mat 3-1 for covering a longitudinal outer circumferential surface of the base mold 40 to an upper part of a film while rotating at the same speed as the base mold 40 is further provided on one side of the base mold 40.

The glass fiber mat 3-1 is hardened along with the glass fiber 3 disposed and laminated in a longitudinal direction, thereby forming the reinforced plastic pipe (P).

In an embodiment, the glass fiber mat supply part 90 includes supports 93 configured to rotate at the same speed in synchronization with the base mold 40 and the shaft tube 30 by power from a supply part 20' that is on one side of the rear of the base mold 40; and a plurality of the winding rolls 91 which are supported by the supports 93 and around which the glass fiber mat 3-1 is wound.

Here, the supply part 20' may be connected to a supply part 20 for rotating a shaft tube by a gear box, a chain, etc. or may be a separate power transmission member having a separate power motor.

Next, referring to FIGS. 3, 4(a), 4(b) and 8, a method of continuously manufacturing a reinforced plastic pipe using the apparatus for continuously manufacturing a reinforced plastic pipe using a transfer film according to the present invention is described below.

Figure 8:
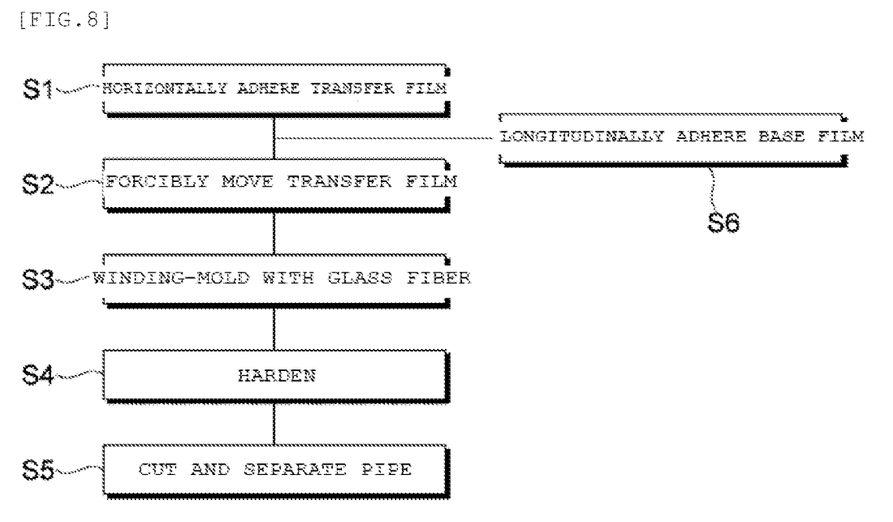
FIG. 8 is a schematic flowchart illustrating a method of manufacturing a reinforced plastic using an apparatus for continuously manufacturing a reinforced plastic pipe using a transfer film according to the present invention.

First, the method of continuously manufacturing a reinforced plastic pipe broadly includes a horizontal transfer film adhesion step (S1); a forced transfer film movement step (S2); a glass fiber winding-molding step (S3); a hardening step (S4); and a pipe cutting and separation step (S5).

In addition, as needed, a longitudinal base film adhesion step (S6) may be further included.

First, the horizontal transfer film adhesion step (S1) is a process of winding a longitudinal outer circumferential surface of the base mold 40, which has an outer circumferential surface of any one of a variety of cross-sectional shapes including a circle, a polygon, and an oval, to be in close contact from the rear to the front with the transfer film 51.

Here, one end of the transfer film 51 on a front side is disposed to be introduced into an opened hollow at a front end of the shaft tube 30 from a front edge of the base mold 40 and to pass to the rear.

Preferably, an entirety of an outer circumferential surface of the base mold 40 may be covered with the transfer film 51.

Next, the forced transfer film movement step (S2) is a process of forcibly withdrawing an end of the transfer film 51 backward using the transfer film draw-out part 60.

The shaft tube 30 and the base mold 40 rotate at a speed according to setting by the driving part 20.

Here, the end of the transfer film 51 that has passed through the hollow of the shaft tube 30 is grasped with the transfer film draw-out part 60 and is forcibly withdrawn backward at a speed according to setting.

Accordingly, the transfer film 51 in close contact with an outer circumferential surface of the base mold 40 is forcibly moved forward.

Next, the glass fiber winding-molding step (S3) is a process of winding an outer circumferential surface of the base mold 40 with the resin-impregnated glass fiber 3 to be laminated according to a known filament winding method to mold into the reinforced plastic pipe (P).

Preferably, the glass fiber winding-molding step (S3) is performed along with the forced transfer film movement step (S2).

In particular, the base mold 40, an outer circumferential surface of which has been in close contact with the transfer film 51, rotates at a speed according to setting along with the shaft tube 30 by the driving part 20.

In addition, as commonly known, the resin-impregnated glass fiber 3 winds around an outer circumferential surface of the base mold 40 from a side of the base mold 40 according to a filament winding method and is laminated thereon, and the laminated glass fiber 3 is molded into the reinforced plastic pipe (P).

The base mold 40 rotates at a speed at which the glass fiber 3 can be naturally hardened to some extent over time. Such a rotational speed may be controlled according to setting.

Meanwhile, a method of molding the reinforced plastic pipe (P) according to a filament winding method is a well-known technique, and thus, the detailed description thereof will be omitted so as not to obscure the subject matter of the present invention.

However, the method of continuously manufacturing a reinforced plastic pipe using a transfer film of the present invention includes a process of increasing the longitudinal tensile strength of a molded reinforced plastic pipe (P) to prevent breakage and bending thereof when used in the field.

For this, the glass fiber winding-molding step (S3) includes a process of covering the film on a longitudinal outer circumferential surface of the base mold 40 with the glass fiber mat 3-1 in the same manner as the transfer film 51.

The reinforced plastic pipe (P) produced by disposing the glass fiber mat 3-1 in a longitudinal direction and winding the glass fiber 3 from a side exhibits increased tensile strength.

The molded reinforced plastic pipe (P) is forcibly, continuously moved from the outer circumferential surface of the base mold 40 to the front by the transfer film 51. At the same time, in the rear, the glass fiber 3 is wound around the outer circumferential surface of the base mold 40 to be connected to a continuously moving reinforced plastic pipe (P), thereby molding the reinforced plastic pipe (P).

Next, the hardening step (S4) is a process of hardening the reinforced plastic pipe (P), which has been subjected to the glass fiber winding-molding step (S3), using the hardening means 4.

As the hardening means 4, a natural hardening method over time, a hardening method using natural wind, a forced hardening method using a hot air balloon, etc. or a combination thereof may be used.

Next, the pipe cutting and separation step (S5) is a process of cutting the reinforced plastic pipe (P), which has been subjected to the hardening step (S4), to a predetermined length using the cutting means 5.

Accordingly, the reinforced plastic pipe (P) has a tubular shape with any one of a variety of cross-sectional shapes including a circle, a polygon, and an oval according to the shape of the outer circumferential surface of the base mold 40 and is produced to a predetermined length.

Meanwhile, as described above, the longitudinal base film adhesion step (S6) of spirally covering and winding an outer circumferential surface of the base mold 40, which has been subjected to the horizontal transfer film adhesion step (S1), from a side with the base film 71 is further included.

The base film 71 serves as a release paper that completely separates the outer circumferential surface of the base mold 40 from the glass fiber 3, and surrounds and spirally winds the outer circumferential surface of the base mold 40 according to forward movement of the transfer film 51.

Preferably, the base film 71 moves forward along with the reinforced plastic pipe (P) molded by being wound with the glass fiber 3.

By the method of continuously manufacturing a reinforced plastic pipe using a transfer film of the present invention, the reinforced plastic pipe (P) molded according to lamination-molding of the glass fiber 3 is continuously moved forward using the transfer film 51, thereby being capable of easily, continuously manufacturing a reinforced plastic pipe (P) having a desired length.

It will be understood by those skilled in the art that various changes in form and details may be made therein without departing from the spirit and scope of the invention. Therefore, the scope of the invention is defined not by the embodiments and the accompanying drawings.

The invention claimed is:

1. An apparatus for continuously manufacturing a reinforced plastic pipe using a transfer film, the apparatus being capable of winding an outer circumferential surface of a rotating base mold with a resin-impregnated glass fiber depending on a filament winding method and hardening the same to continuously manufacture a reinforced plastic pipe to a predetermined length depending on setting, the apparatus comprising:
   a shaft tube configured to have a certain length and a hollow tubular shape, front and rear ends of which are opened, supported by a frame part, and configured to rotate at a rotational speed depending on setting by a driving part;
   a base mold configured to have a tubular shape having an outer circumferential surface of any one of a variety of cross-sectional shapes comprising a circle, a polygon and an oval and to rotate integrally with the shaft tube with respect to the shaft tube as a central axis;
   a transfer film supply part configured to rotate in the same manner as the shaft tube while supplying a transfer film that covers a longitudinal outer circumferential surface of the base mold and winds the longitudinal outer circumferential surface in close contact therewith from the rear to the front, wherein an end of the transfer film in close contact in the front is introduced into an opened hollow on a front end side of the shaft tube from a front edge of the base mold and passes through a rear end of the shaft tube; and
   a transfer film draw-out part disposed in the rear of the shaft tube and configured to grasp an end of the transfer film, which has passed through the hollow, and to forcibly withdraw the same backward at a speed depending on setting so as to move the transfer film in close contact with the outer circumferential surface of the base mold forward at a speed depending on setting,
   wherein the reinforced plastic pipe is continuously manufactured while moving the reinforced plastic pipe, which is wound and molded on a film, forward according to forward movement of the transfer film in close contact with the outer circumferential surface of the base mold.

2. The apparatus according to claim 1, further comprising a base film supply part for supplying a base film that spirally covers and winds an outer circumferential surface of the base mold comprising the transfer film, from one side.

3. The apparatus according to claim 1, wherein the base mold comprises a plurality of perforations into which air or a lubricant for reducing friction between the outer circumferential surface of the base mold and a film are introduced.

4. The apparatus according to claim 1, wherein at least front part of the base mold is tapered in a longitudinal direction to have an angle depending on setting.

5. The apparatus according to claim 1, wherein the base mold further comprises:
   a plurality of tapered members extending in a longitudinal direction from a tip to have an inclined angle tapered in a central axis direction; and
   a plurality of the guide pulleys disposed at upper parts of the tapered members and configured to support the transfer film and guide the transfer film into a hollow of the shaft tube.

6. The apparatus according to claim 1, wherein the transfer film draw-out part comprises:
   a pair of transfer gears configured to bite and pull the transfer film using engaged gear cogs; or
   a winding rod for winding and pulling the transfer film.

7. The apparatus according to claim 1, wherein a glass fiber mat supply part for supplying the glass fiber mat for covering a longitudinal outer circumferential surface of the base mold to an upper part of a film while rotating at the same speed as the base mold is further provided on one side of the base mold.

8. The apparatus according to claim 7, wherein:
the glass fiber mat supply part comprises supports configured to rotate at the same speed in synchronization with the base mold by power from a supply part that is on one side of the rear of the base mold; and
a plurality of the winding rolls which are supported by the supports and around which the glass fiber mat is wound.

9. A method of continuously manufacturing a reinforced plastic pipe using the apparatus of claim 1 for continuously manufacturing a reinforced plastic pipe using a transfer film, the method comprising:
a horizontal transfer film adhesion step of winding a longitudinal outer circumferential surface of a base mold with a transfer film in close contact therewith from the rear to the front, introducing a front end of the transfer film into an opened hollow at a front end of a shaft tube from a front edge of the base mold, and placing to pass the front end through a rear end of the shaft tube;
a forced transfer film movement step of grasping the end of the transfer film, which has passed through the hollow of the shaft tube, while rotating the shaft tube and the base mold at a speed according to setting, and forcibly withdrawing the end backward at a speed according to setting to move the transfer film in close contact with the outer circumferential surface of the base mold forward;
a glass fiber winding-molding step of winding the outer circumferential surface of the base mold, to which the transfer film has been closely attached, with a resin-impregnated glass fiber from one side of the outer circumferential surface of the base mold to laminate and mold the reinforced plastic pipe and continuously moving the molded reinforced plastic pipe forward by the transfer film;
a hardening step of hardening the moved reinforced plastic pipe, which has been subjected to the glass fiber winding-molding step, using a hardening means; and
a pipe cutting and separation step of cutting and separating the reinforced plastic pipe, which has been subjected to the hardening step, to a predetermined length using a cutting means.

10. The method according to claim 9, further comprising a longitudinal base film adhesion step of spirally covering and winding an outer circumferential surface of the base mold, which has been subjected to the horizontal transfer film adhesion step, from a side with a base film.

11. The method according to claim 9, wherein the glass fiber winding-molding step comprises a process of covering the film on a longitudinal outer circumferential surface of the base mold with a glass fiber mat in the same manner as the transfer film.

12. The method according to claim 9, wherein the apparatus further comprises a base film supply part for supplying a base film that spirally covers and winds an outer circumferential surface of the base mold comprising the transfer film, from one side.

13. The method according to claim 12, further comprising a longitudinal base film adhesion step of spirally covering and winding an outer circumferential surface of the base mold, which has been subjected to the horizontal transfer film adhesion step, from a side with a base film.

14. The method according to claim 12, wherein the glass fiber winding-molding step comprises a process of covering the film on a longitudinal outer circumferential surface of the base mold with a glass fiber mat in the same manner as the transfer film.

15. The method according to claim 9, wherein the base mold comprises a plurality of perforations into which air or a lubricant for reducing friction between the outer circumferential surface of the base mold and a film are introduced.

16. The method according to claim 15, further comprising a longitudinal base film adhesion step of spirally covering and winding an outer circumferential surface of the base mold, which has been subjected to the horizontal transfer film adhesion step, from a side with a base film.

17. The method according to claim 15, wherein the glass fiber winding-molding step comprises a process of covering the film on a longitudinal outer circumferential surface of the base mold with a glass fiber mat in the same manner as the transfer film.

18. The method according to claim 9, wherein at least front part of the base mold is tapered in a longitudinal direction to have an angle depending on setting.

19. The method according to claim 18, further comprising a longitudinal base film adhesion step of spirally covering and winding an outer circumferential surface of the base mold, which has been subjected to the horizontal transfer film adhesion step, from a side with a base film.

20. The method according to claim 18, wherein the glass fiber winding-molding step comprises a process of covering the film on a longitudinal outer circumferential surface of the base mold with a glass fiber mat in the same manner as the transfer film.

21. The method according to claim 9, wherein the base mold further comprises:
a plurality of tapered members extending in a longitudinal direction from a tip to have an inclined angle tapered in a central axis direction; and
a plurality of the guide pulleys disposed at upper parts of the tapered members and configured to support the transfer film and guide the transfer film into a hollow of the shaft tube.

22. The method according to claim 21, further comprising a longitudinal base film adhesion step of spirally covering and winding an outer circumferential surface of the base mold, which has been subjected to the horizontal transfer film adhesion step, from a side with a base film.

23. The method according to claim 21, wherein the glass fiber winding-molding step comprises a process of covering the film on a longitudinal outer circumferential surface of the base mold with a glass fiber mat in the same manner as the transfer film.

24. The method according to claim 9, wherein the transfer film draw-out part comprises:
a pair of transfer gears configured to bite and pull the transfer film using engaged gear cogs; or
a winding rod for winding and pulling the transfer film.

25. The method according to claim 24, further comprising a longitudinal base film adhesion step of spirally covering and winding an outer circumferential surface of the base mold, which has been subjected to the horizontal transfer film adhesion step, from a side with a base film.

26. The method according to claim 24, wherein the glass fiber winding-molding step comprises a process of covering the film on a longitudinal outer circumferential surface of the base mold with a glass fiber mat in the same manner as the transfer film.

27. The method according to claim 9, wherein a glass fiber mat supply part for supplying the glass fiber mat for covering a longitudinal outer circumferential surface of the base mold to an upper part of a film while rotating at the same speed as the base mold is further provided on one side of the base mold.

28. The method according to claim 27, further comprising a longitudinal base film adhesion step of spirally covering and winding an outer circumferential surface of the base mold, which has been subjected to the horizontal transfer film adhesion step, from a side with a base film.

29. The method according to claim 27, wherein the glass fiber winding-molding step comprises a process of covering the film on a longitudinal outer circumferential surface of the base mold with a glass fiber mat in the same manner as the transfer film.

30. The method according to claim 27, wherein:
   the glass fiber mat supply part comprises supports configured to rotate at the same speed in synchronization with the base mold by power from a supply part that is on one side of the rear of the base mold; and
   a plurality of the winding rolls which are supported by the supports and around which the glass fiber mat is wound.

31. The method according to claim 30, further comprising a longitudinal base film adhesion step of spirally covering and winding an outer circumferential surface of the base mold, which has been subjected to the horizontal transfer film adhesion step, from a side with a base film.

32. The method according to claim 30, wherein the glass fiber winding-molding step comprises a process of covering the film on a longitudinal outer circumferential surface of the base mold with a glass fiber mat in the same manner as the transfer film.

\* \* \* \* \*